United States Patent
Richman et al.

(10) Patent No.: US 7,878,114 B2
(45) Date of Patent: Feb. 1, 2011

(54) SYNCHRONIZED UNLOADING SYSTEM AND METHOD FOR A COTTON HARVESTER WITH ON-BOARD MODULE BUILDER

(75) Inventors: Kevin S. Richman, Lititz, PA (US); Justin R. Ringwald, New Holland, PA (US); Frank C. Dupire, Manheim, PA (US)

(73) Assignee: CNH America LLC, New Holland, PA (US)

( * ) Notice: Subject to any disclaimer, the term of this patent is extended or adjusted under 35 U.S.C. 154(b) by 220 days.

(21) Appl. No.: 12/206,488

(22) Filed: Sep. 8, 2008

(65) Prior Publication Data
US 2009/0123261 A1  May 14, 2009

Related U.S. Application Data

(60) Provisional application No. 60/967,620, filed on Sep. 6, 2007.

(51) Int. Cl.
| | |
|---|---|
| B30B 15/26 | (2006.01) |
| B30B 15/32 | (2006.01) |
| B60P 1/00 | (2006.01) |
| A01D 46/08 | (2006.01) |

(52) U.S. Cl. .............. 100/45; 100/188 R; 100/218; 414/439; 414/813; 56/10.2 R; 56/28

(58) Field of Classification Search ............. 100/7, 100/43, 45, 188 R, 218; 414/491, 439, 502, 414/813; 56/10.2 R, 10.8, 10.2 A, 11.1, 28
See application file for complete search history.

(56) References Cited

U.S. PATENT DOCUMENTS

| | | | |
|---|---|---|---|
| 1,509,045 A | 9/1924 | Kueber | |
| 1,780,299 A | 11/1930 | Jackson | |
| 2,867,340 A | 1/1959 | Brownlee et al. | 214/521 |
| 3,209,932 A | 10/1965 | Schiltz | 214/505 |
| 3,298,550 A | 1/1967 | Schiltz | 214/505 |
| 4,081,094 A | 3/1978 | Pereira et al. | 214/355 |
| 4,241,653 A | 12/1980 | Fagundes et al. | 100/100 |
| 4,419,042 A | 12/1983 | Reed | 414/786 |
| 5,025,614 A | 6/1991 | Orsborn et al. | 56/10.2 |
| 5,108,250 A | 4/1992 | Fewin, Jr. et al. | 414/528 |
| 5,178,509 A | 1/1993 | Webb et al. | 414/491 |
| 5,367,857 A | 11/1994 | Carlson | 53/436 |
| 5,911,362 A * | 6/1999 | Wood et al. | 239/1 |
| 6,766,634 B2 | 7/2004 | Covington et al. | 56/480 |
| 6,915,736 B2 | 7/2005 | Leupe et al. | 100/45 |

FOREIGN PATENT DOCUMENTS

WO       8600003       1/1986

* cited by examiner

*Primary Examiner*—Jimmy T Nguyen
(74) *Attorney, Agent, or Firm*—Michael G. Harms; Patrick M. Sheldrake

(57) ABSTRACT

A procedure and system for unloading a compacted cotton module from an on-board module builder of a cotton harvester, which in an automatic mode utilizes a controller to automatically monitor ground speed and operate unloading apparatus at a synchronized ratio to ground speed, for maintaining integrity and shape of the module, and which is quickly and easily switchable between the automatic mode and a manual mode that allows an operator to position and operate the unloading apparatus independent of ground speed for purposes such as placing the module at a precise location such as next to an already unloaded module or the like.

22 Claims, 8 Drawing Sheets

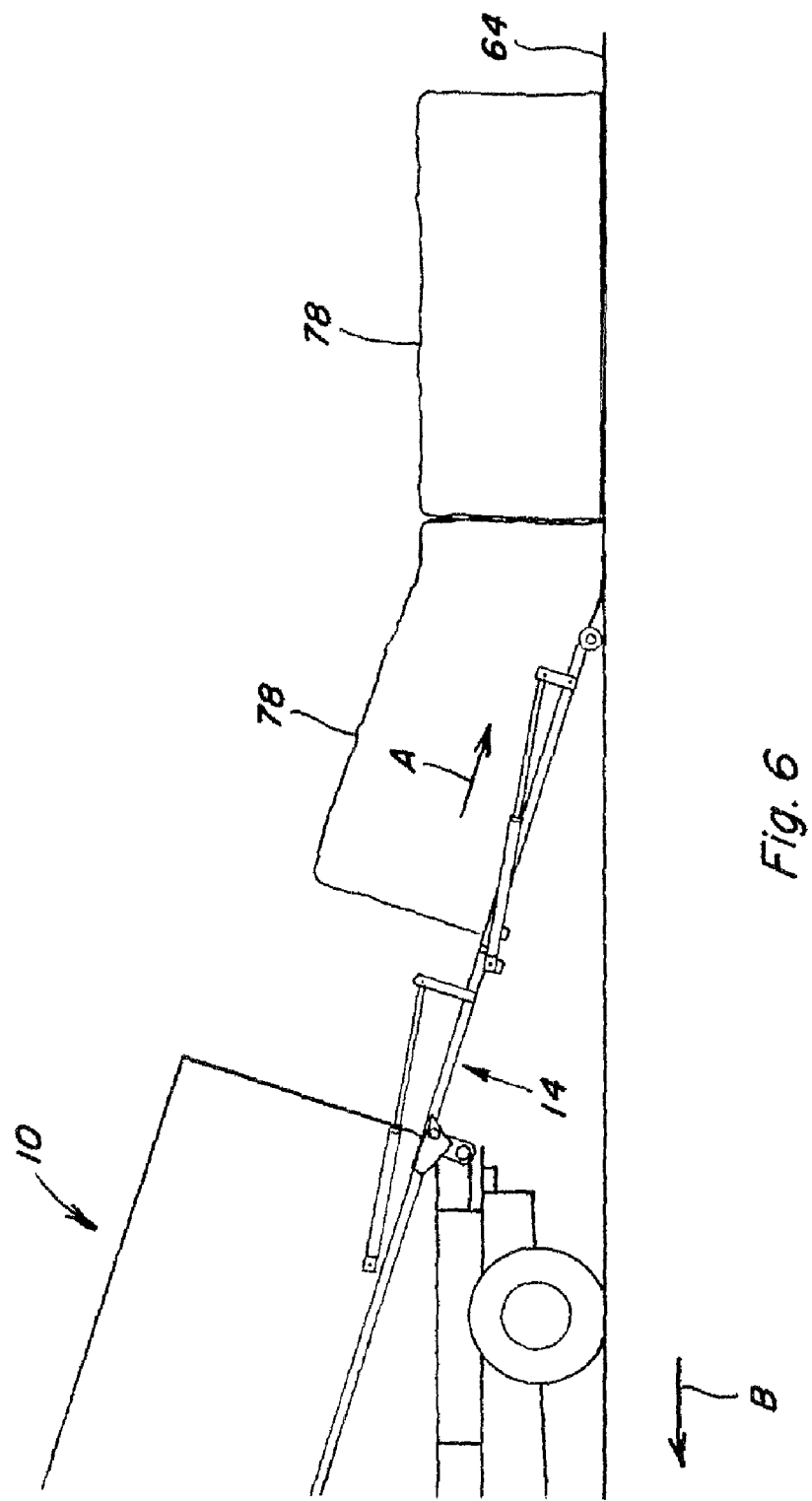

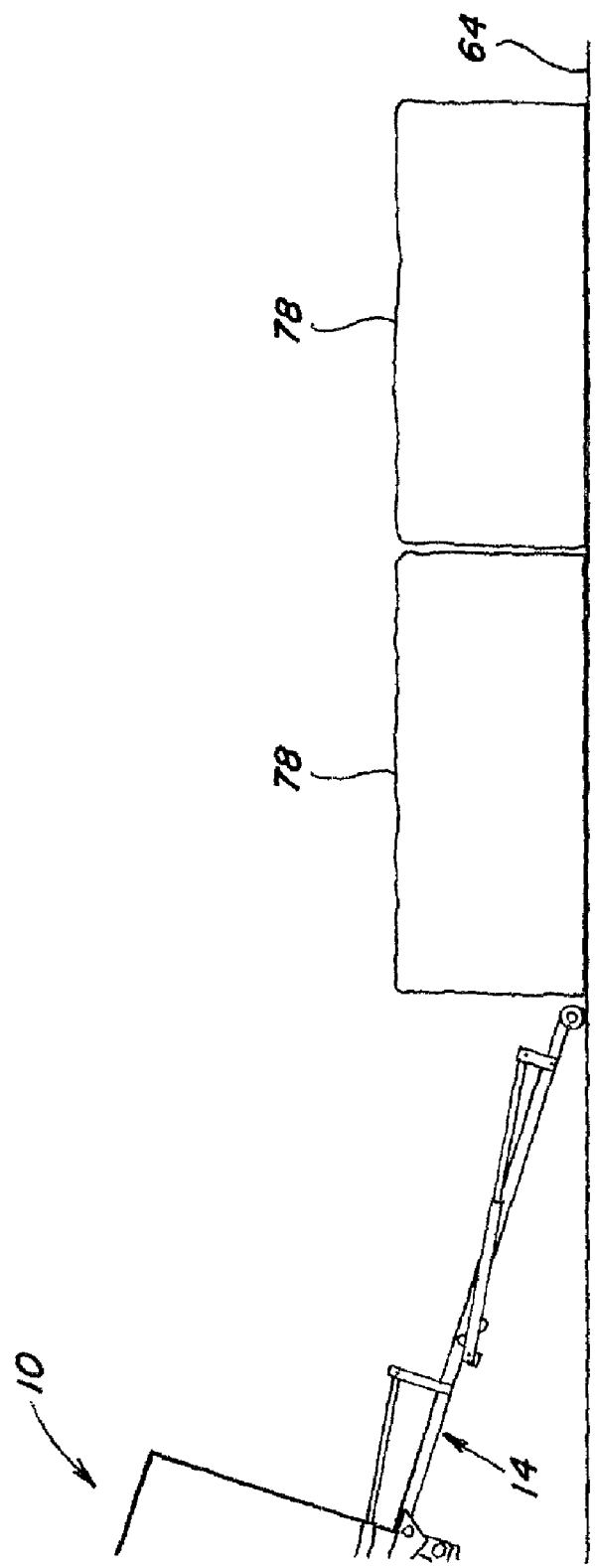

SYNCHRONIZED UNLOADING SYSTEM AND METHOD FOR A COTTON HARVESTER WITH ON-BOARD MODULE BUILDER

This application claims the benefit of U.S. Provisional Application No. 60/967,620, filed Sep. 6, 2007.

TECHNICAL FIELD

This invention relates generally to a procedure and system for unloading a compacted cotton module from an on-board module builder of a cotton harvester, and more particularly, to a system and procedure which in an automatic mode notifies the operator that the module is ready to unload, and utilizes a controller to automatically monitor ground speed and operate unloading apparatus at a synchronized ratio to ground speed, for maintaining integrity and shape of the module, and which is quickly and easily switchable between the automatic mode and a manual mode that allows an operator to position and operate the unloading apparatus independent of ground speed for purposes such as placing the module at a precise location such as next to an already unloaded module or the like.

BACKGROUND ART

U.S. Provisional Application No. 60/967,620, filed Sep. 6, 2007, is incorporated herein by reference in its entirety.

When loading a compacted mass of crop material, such as a cotton module, from the ground or another surface onto a ramp or other loading apparatus of a transport vehicle, or when unloading, it is typically desired for the speed of movement of the mass or module along or over the ramp, and the speed of the vehicle over the ground or other surface, to be synchronized. Particularly when unloading, if the speeds are not synchronized, e.g., the vehicle is moving significantly faster over the ground than the mass or module is moving along the ramp, the mass or module can be damaged, and even pulled apart, which is particularly not desired in the case of cotton modules, as it can make subsequent handling more difficult and affect the price paid for the cotton and subsequent ginning.

Various apparatus and systems for automatically synchronizing vehicle ground speed and unloader or crop drivers, such as chains belts or the like, on a ramp for moving a crop mass or module upwardly or downwardly therealong, are well known. Reference as examples, Pereira et al., U.S. Pat. No. 4,081,094, issued Mar. 28, 1978; Reed U.S. Pat. No. 4,419,042, issued Dec. 6, 1983; and Fewin, Jr. et al., U.S. Pat. No. 5,108,250, issued Apr. 28, 1992.

While any of the above-referenced apparatus and systems may provide satisfactory manners of synchronization for operation under a variety of circumstances, including on uneven terrain and the like, there are instances when unloading wherein it would be desirable to have additional or other capabilities than those disclosed. In particular, sometimes the human operator will be inexperienced and/or inattentive, and/or will drive the vehicle too fast or too slow for unloading the mass or module, so as to affect the shape of the module, e.g., cause it to lean, or damage the module, e.g., fracture or tear, even with a capability for synchronizing the unloader driver speed with the ground speed of the vehicle. In this instance, it has been found desirable to have the capability to inform the operator when a module moving down the ramp is close to contacting the surface onto which it is to be unloaded, and during unloading onto the surface, to warn or notify the operator of excessive ground speed, but without automatically taking steps such as limiting unloading speed, which could damage the module.

Also, sometimes when unloading a cotton module, it is desired to place the module in end-to-end relation or abutment with another module, for reasons including to make loading of the modules onto a transport vehicle in a continuous process easier, and to protect the abutting module ends from exposure to environmental elements, particularly moisture. This will entail one or more reverse or backing movements, or back and forward movements of the vehicle for positioning the end of the unloading ramp adjacent to and aligned with the bottom of the first or stationary module. This also requires a capability for unloading the second module down the ramp into abutment with, or close to, the stationary module, without dragging or pushing a portion of the second module over the ground, or exerting a force against the modules, which could damage one or both of the modules. The vehicle will then be moved forward as the second module is unloaded, which is facilitated by synchronization of the crop driver or drivers with ground speed to complete the unloading process, but not at a speed that is too fast, so as to result in an undesired gap between the modules or damage.

Accordingly, what is sought is an unloading system and method which provides one or more of the capabilities and overcomes one or more of the problems and shortcomings, set forth above.

SUMMARY OF THE INVENTION

What is disclosed is a system and method for unloading a mass or module of compacted crop material from a self-propelled machine, such as, but not limited to a cotton harvester with an onboard cotton module builder, which provides one or more of the capabilities and overcomes one or more of the problems and shortcomings, set forth above.

According to a preferred aspect of the invention, the system and method utilizes at least one driver on an unloading ramp, operable for controllably moving a mass of compacted crop material, which can include, but is not limited to, a cotton module, down the ramp and onto a surface therebelow, which can be, for instance, the ground or the like. The driver or drivers can include, but are not limited to, drag chains, belts or the like. The invention uses a controller connected in operative control of the at least one driver, and apparatus for providing information representative of a speed of movement of the vehicle over the surface to the controller. This can be a ground speed sensor, a wheel speed sensor, any device that accurately computes ground speed from engine or transmission speed data, or the like. The machine will include a propulsion control, e.g., including a conventional propulsion handle located in the operator cab, operable by the operator for controlling the speed of movement of the vehicle over the surface. The invention uses an input device connected to the controller and operable by an operator for inputting commands thereto, which is preferably disposed on or in connection with the propulsion control, for convenience and ease of use. This device is preferably a momentary contact switch, or the like. The invention also preferably includes a device connected to the controller for outputting information to a human operator, such as a signal alarm, or display device, located in the operator cab.

The invention also preferably utilizes an unloading routine programmed in the controller, which, upon initiation, will commence operation of the at least one driver for moving the mass, e.g., cotton module, down the ramp while monitoring the speed of movement of the vehicle (if any) over the surface, and the direction of movement. In a preferred automatic manner or mode of operation, if the speed of movement of the vehicle is equal to or greater than a predetermined value, which is preferably a number just above zero, then the controller will continue the automatic operation of the at least one driver to move the mass down the ramp and onto the surface. If the speed of movement of the vehicle is less than the predetermined value, e.g., is zero, or in the reverse direction, and absent an override command from the input device, the controller will automatically commence to pause the operation of the at least one driver to gradually stop the movement of the mass down the ramp before reaching the surface, and to output a message to the operator to commence movement of the vehicle. The pausing is preferably done gradually, to prevent damage, jerking and other objectionable occurrences. The controller will subsequently enable continued operation of the at least one driver to move the mass down the ramp onto the surface only if the vehicle commences movement in the unloading direction, or a predetermined command from the input device is received to place the system in the manual mode. For example, this command can be outputted by momentary operation of the input device.

When enabled, the further operation of the at least one driver is preferably selectable to be automatic, as a function of the speed of the vehicle, or operator or manually controlled. In the automatic mode, if the speed of movement of the vehicle is within a predetermined range, then the controller will automatically control the operation of the at least one driver for moving the mass down the ramp at a speed which is at a predetermined ratio to the speed of movement of the vehicle. The range can comprise, for example, a range from just greater than zero to a maximum safe speed for unloading without damaging the mass or module or the vehicle. The ratio will preferably be a value greater than 1:1, and more preferably about 1.1:1. Also preferably, if the speed of movement of the vehicle is greater than the predetermined range, the controller will automatically output information representative thereof to the operator. This information will preferably include a textual indication that the vehicle speed exceeds a maximum value, and/or it could be an audible/and or visual signal.

As an advantage of the system, an operator can initiate operation of the unloading system to automatically move the compacted mass or module down the ramp, before, after, and/or during maneuvering of the harvester into a desired position for unloading, and the system provides a safety measure which will gradually stop the downward movement of the module before it contacts the surface onto which it is to be unloaded, if the vehicle is not moving in the unloading direction. This is also advantageous as it gives the operator, particularly if inexperienced, a chance to verify positioning, etc., and to maneuver the harvester further, if required, before the module is actually unloaded. It also enables use of one unloader driver speed for initial movement of the module over the ramp while still completely on the ramp, and another speed when the module is only partially on the ramp so as to also be in contact with the surface onto which the module is being unloaded. If the vehicle is moving appropriately for unloading, the system will automatically synchronize the unloader driver speed at a predetermined ratio to the ground speed, to unload the mass or module. And, while being unloaded onto the surface, if the vehicle speed exceeds a maximum value, the system will output a signal or message to the operator, but will continue to operate the unloader driver or drivers at a speed sufficient for unloading while protecting the integrity of the mass or module. This can be the speed at the predetermined ratio, or another speed, as desired.

The manual mode of operation of the invention is advantageous as it allows the operator to operate the unloader driver or drivers independent of vehicle speed and direction, and in a manner as desired or required for positioning a mass or module at a precise location, such as adjacent to or in abutment with an existing structure or item, such as another mass or module. This enables an operator to operate the unloader driver or drivers in the automatic mode to safely position the mass or module on the ramp in a desired position in relation to an existing module, e.g., so as to bring the tops of the modules into alignment and contact, and then switch to the manual mode, with the vehicle stationary, or moving in the unloading direction, or in reverse of the unloading direction, as required for bringing the bottoms of the modules together, and then, with the modules desirably positioned, to switch to operate in the automatic mode to finish unloading the module. Inputted operating commands in the manual mode can comprise, for instance, prolonged actuation of the input device. Commands for switching between the automatic and manual modes can comprise, for instance, momentary actuations of the input device.

BRIEF DESCRIPTION OF THE DRAWINGS

FIG. 6 is still another partial side view of the harvester, illustrating unloading of a module in abutment with another module; and FIG. 7 is still another partial side view of the harvester, illustrating the module unloaded in abutment with the other module.

DETAILED DESCRIPTION OF THE INVENTION

Figure 1:
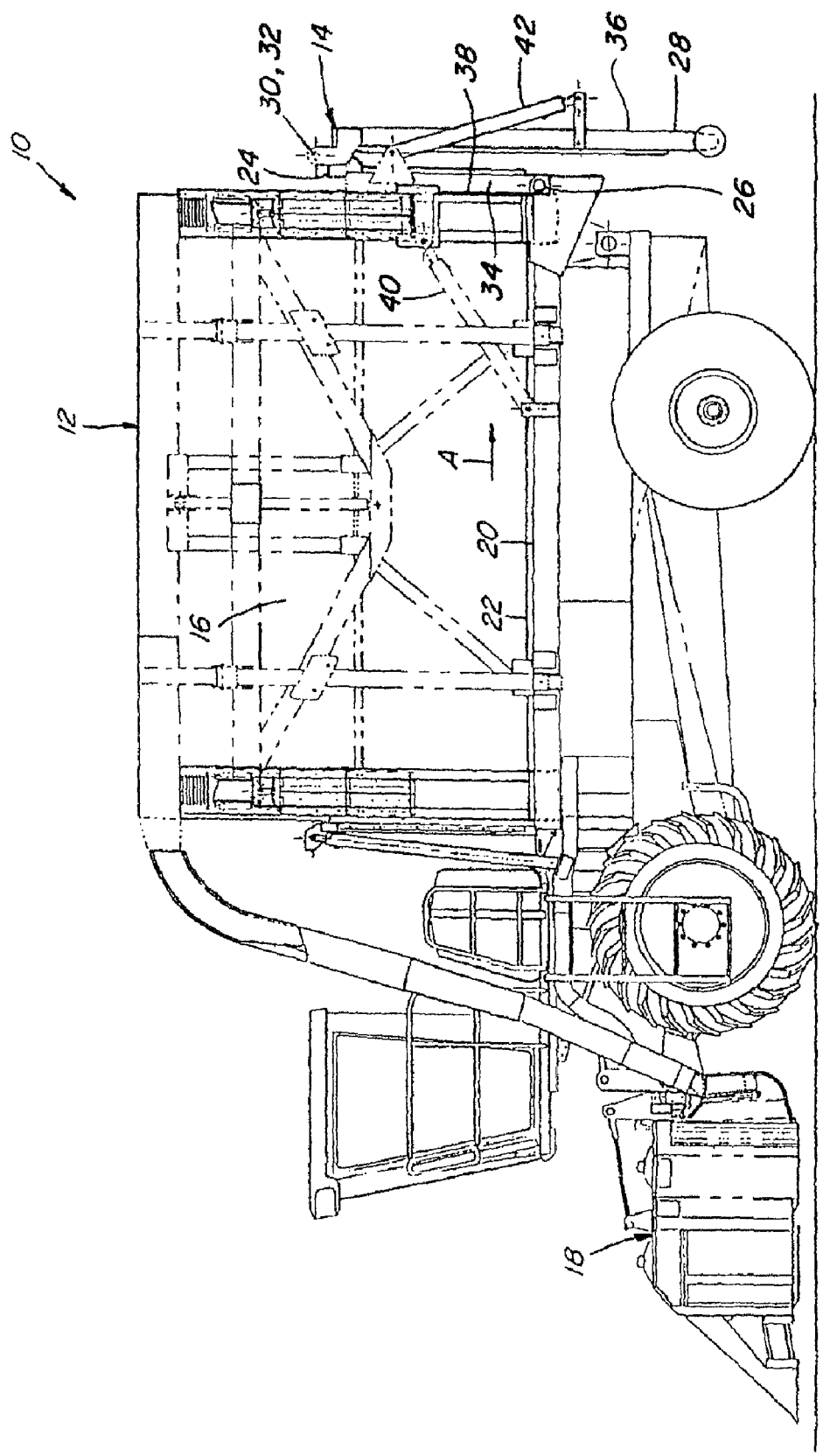
FIG. 1 is a simplified side view of a self-propelled cotton harvester including an onboard cotton module builder, including aspects of a system and method of the invention for unloading a compacted module from the module builder.
Figure 1A:
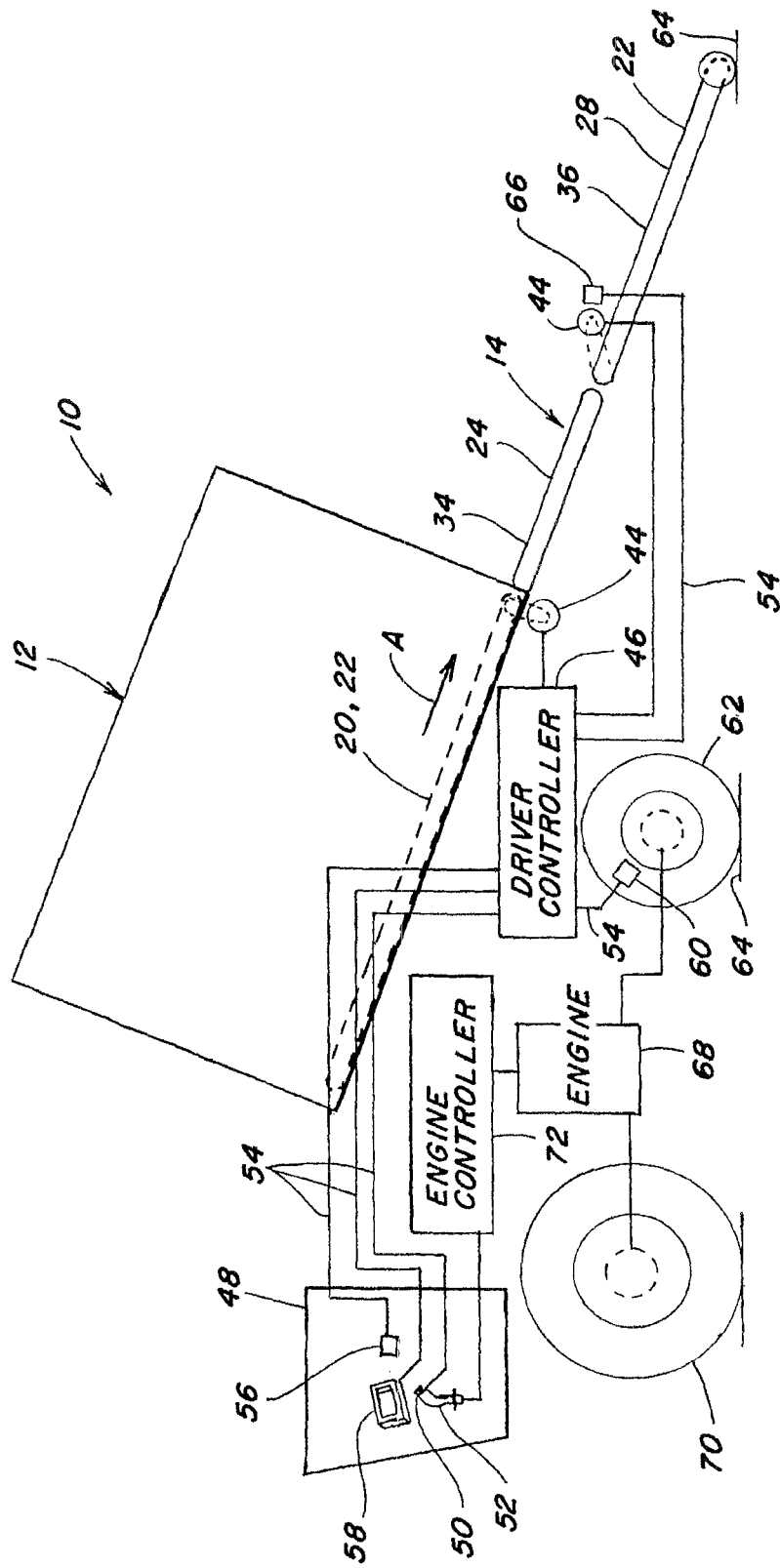
FIG. 1a is a simplified schematic side view of the harvester of FIG. 1, shown in a tilted, unloading position with an unloading ramp deployed extending downwardly therefrom, and showing aspects of the system of the invention for unloading a compacted module from the module builder.

Referring now to the drawings, in FIGS. 1 and 1a, a cotton harvesting machine 10 is shown, including a cotton packager or module builder 12, and a pivoting unloading door 14, shown in a folded or closed position (FIG. 1), and in an unfolded or deployed position (FIG. 1a). Module builder 12 includes an interior that defines a cotton compacting or module building chamber 16 for receiving cotton from harvesting units 18 of machine 10 and in which the harvested cotton is compacted into a unitary body or module of cotton (not shown) in the well known conventional manner. It should be noted that for the purposes herein, the terms ramp and door are considered to be interchangeable, and that the term cotton module builder is to encompass a cotton packager and also a basket, and is intended to be representative of a wide variety of apparatus from which a mass of crop material could be unloaded using the system and method of the present invention.

The bottom of chamber 16 is defined and enclosed by an upwardly facing floor surface 20. A plurality of unloader drivers 22 extend forwardly and rearwardly in spaced relation one to the other over floor surface 20 and encircle drive sprockets at the rearward end of floor surface 20, and suitable elements at the forward end thereof (not shown). Drivers 22 comprise elements of an unloader system of the present invention and preferably comprise drag chains of well-known construction, and are drivable in a predetermined unloading direction, denoted by arrow A, over floor surface 20, for conveying a compacted body or module of cotton from the interior of the chamber.

Unloading door assembly 14 is also part of the system of the invention and includes a first door segment 24 pivotally connected at a pivot joint 26 to the rearward end of cotton module builder 12 of machine 10, for pivotal movement of door segment 24 between a closed position in at least partial closing or covering relation to a rear unloading opening 38 as shown in FIG. 1, and an unloading or open position as shown in FIG. 1*a*. Door assembly 14 additionally includes a second door segment 28 pivotally connected by a pivot joint 30 (FIG. 1) to first door segment 24 for relative pivotal movement of door segments 24 and 28 about a pivotal axis 32 extending through joint 30 transversely to predetermined direction A. Door assembly 14 is pivotable between a folded or closed position (FIG. 1) with door segments 24 and 28 in generally overlaying relation and first and second conveying surfaces 34 and 36 thereof, respectively, facing in opposite directions, and an unfolded or open unloading position (FIG. 1*a*) in end-to-end relation wherein floor surface 20 and first and second conveying surfaces 34 and 36 form a substantially continuous surface extending in direction A. Pivotal movement of first and second door segments 24 and 28 is effected, respectively, by fluid cylinders 40 and 42, in the well known manner. Tilting of module builder 12 is also effected by a fluid cylinder or cylinders, in the well-known manner.

As shown in FIG. 1*a*, at least second door segment 28 of unloading door 14 will include additional unloader drivers 22 of the system of the invention drivable in unloading direction A, for conveying a compacted body or module of cotton over the deployed door 14 assembly. Here, conveying surface 34 preferably comprises one or more low friction polymer sheets, for low friction movement of a compacted body of cotton thereover, so as to eliminate the need of unloader drivers on door segment 28. Unloader drivers 22 are each driven using a suitable drive mechanism 44, which can include a motor, such as, but not limited to, a fluid or electric motor, connected by a drive chain in driving relation to a sprocket encircled by the drag chain of the driver. The construction and operation of a typical module builder 10, door assembly 14, drivers 22 and drive mechanisms 44, are explained in greater detail in Covington et al., U.S. Pat. No. 6,766,634, issued Jul. 27, 2004, and U.S. Pat. No. 7,322,460, issued Jan. 29, 2008, which are hereby incorporated herein by reference in their entireties.

Operation of unloader drivers 22 will be controlled according to a method of the present invention, using a processor based driver controller 46, which can be, for instance, an electronic control unit (ECU) typically used for controlling unloading operations, also including tilting of module builder 12 and unfolding and folding of door assembly 14, as disclosed in Covington et al., U.S. Pat. No. 6,766,634. Operation of drivers 22 can be commenced automatically when module builder 12 is appropriately tilted and door assembly 14 is unfolded, as commonly done using a contact switch in connection with a solenoid, or, can be initiated in any suitable manner, such as manually by a human operator in an operator cab 48, using an input device 50 therein, which preferably comprises a momentary contact switch located on a propulsion control handle 52. Device 50 can have one position, or more, so as to also be operable for effecting operation of drivers 22 in a reverse or loading direction, as desired.

The tilting and unfolding operations can be initiated also by input device 50, or by a separate switch, as illustrated by switch 56 also located in cab 48, as desired. Input device 50 and switch 56 are preferably connected to driver controller 46 via suitable conductive paths 54, such as, wires of a wiring harness of machine 10, a controller area network, wireless network, or the like.

A display device 58 is also preferably located in cab 48, and connected to controller 46 via a suitable conductive path, and is operable for displaying information, including about the status of unloading operations, speeds, warnings, and the like.

A speed sensor 60 or other suitable apparatus is connected via a suitable conductive path 54 to controller 46, and is operable for sensing rotation of a rear wheel 62 of machine 10, representative of a speed of movement of machine 10 over a surface 64 on which it is located, which can be, but is not limited to, the ground. Alternatively, a ground sensor, e.g., sound or radar based, or transmission or engine rotation data, could be used for determining ground speed. A speed sensor is suitably located for sensing the speed of operation of at least unloader driver 22 located on second door segment 28, and is also connected to controller 46 by a suitable conductive path 54. All of the above elements are part of the unloader system of the invention.

Additional relevant aspects of machine 10 include an engine 68 operable for drivingly rotating at least front drive wheels 70 (and optionally rear wheels 62 if equipped with rear drive assist) via a suitable fluid and/or mechanical path; and an engine controller 72, controllably operable for controlling propulsion of machine 10, responsive to inputs received from propulsion control 52 in the well known manner.

Figure 2:
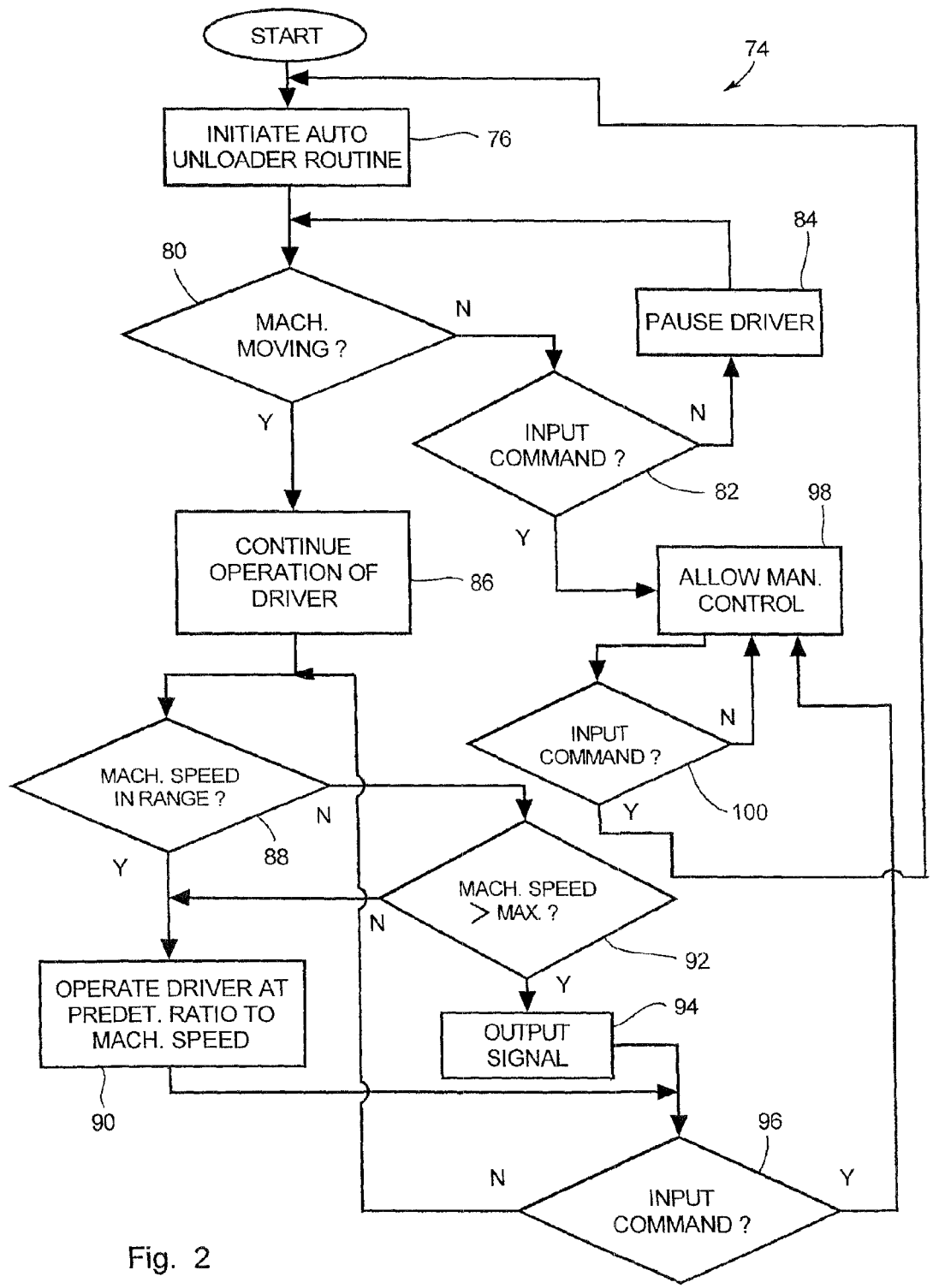
FIG. 2 is a high-level flow diagram illustrating steps of one embodiment of a method of the invention.
Figure 3:
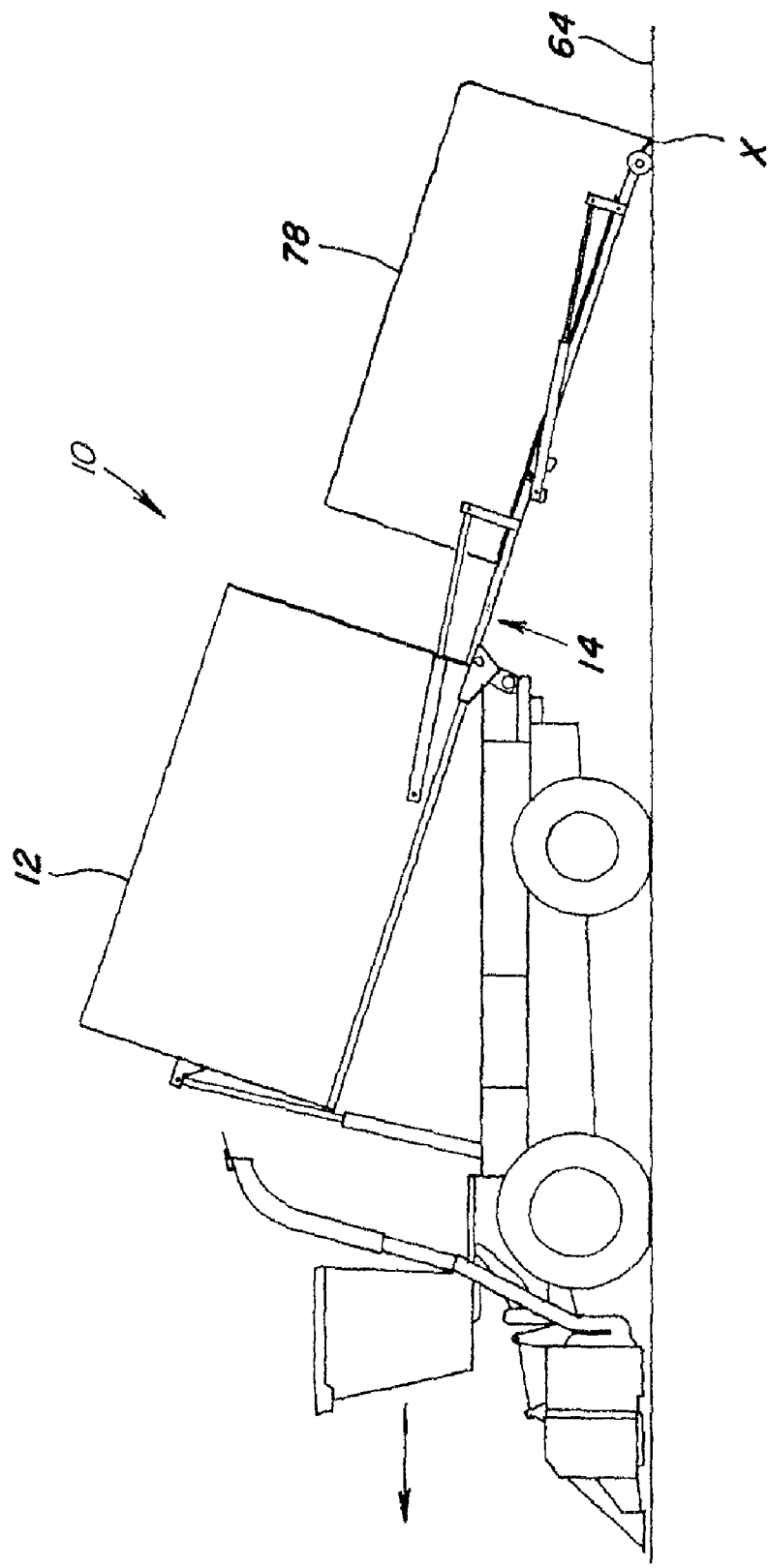
FIG. 3 is another side view of the harvester, illustrating an aspect of a method for unloading of a compacted module according to the invention.
Figure 4:
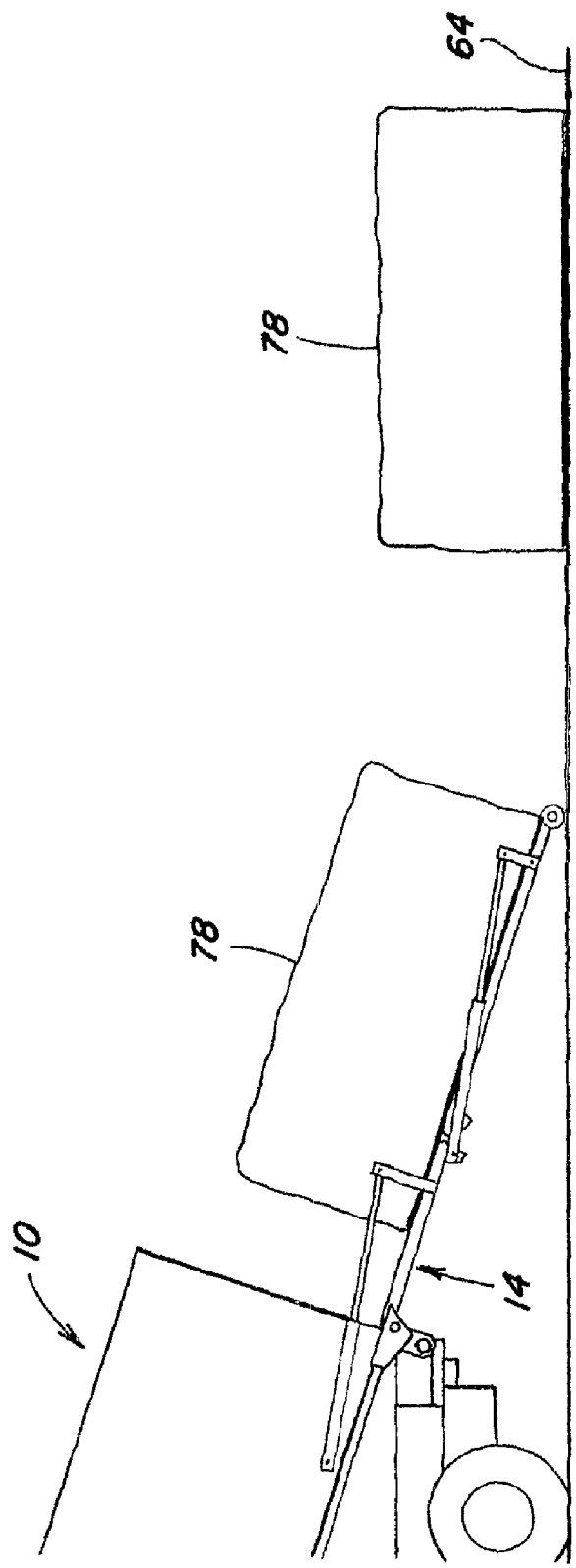
FIG. 4 is a partial side view of the harvester, illustrating unloading of a module in the vicinity of another module.

Referring also to FIGS. 2, 3, 4, 5, 6 and 7, typically, when a cotton module is complete, or it is otherwise desired to remove the contents of module builder 12, an unloading operation will be initiated (FIG. 3). Sometimes, it will be desired to unload a module 78 in more of a general location, e.g., free standing alone in a general location on a surface 64 such as the ground (FIG. 4). At other times, it will be desired to unload a module 78 (FIGS. 5 and 6) so as to be precisely located, e.g., in abutting, or closely spaced, end to end relation with another module 78 already on surface 64 (FIG. 7). In the first instance, essentially once module builder 12 is properly tilted and door assembly 14 unfolded, unloader drivers 22 can be actuated to moved the module over door assembly 14 and onto surface 64 synchronized with the speed of movement of machine 10. In the second instance, however, particularly if a module 78 is to be unloaded in close abutment with an existing stationary module 78, such as for any of the reasons set forth above, it may be desired or required to have a capability to maneuver door assembly 14, by moving machine 10 while unloading for achieving such placement.

Aspects of a method of unloading a cotton module or mass of compacted crop material according to the present invention, are shown. In FIG. 2, a high-level flow diagram 74 illustrating steps of a preferred embodiment of the method of the invention, is shown. Referring to the diagram, upon initiation of an unloader routine of the invention, as denoted at block 76, module builder 12 will be automatically tilted and door assembly 14 unfolded, and unloader drivers 22 operated to commence movement of a module 78 (FIG. 3) downwardly along the floor of the module builder and onto door assembly 14. Driver controller 46 will also monitor the speed of movement (if any) of machine 10, as sensed by speed sensor 60. Prior to module 78 reaching surface 64, so as to be supported thereon in any substantial manner, as illustrated by the position X of the lower edge of module 78 in FIG. 3, controller 46 will determine if machine 10 is moving, e.g., any speed greater than zero, in an unloading direction (forward), as denoted by decision block 80. If machine 10 is not moving in the prescribed direction and manner, controller 46 will determine if a predetermined input command from input device 50 is present, as denoted by decision block 82. This can comprise a momentary operation of device 50, operation of that input for a prescribed period, or other suitable signal. If the input is not present, controller 46 will automatically commence to pause the operation of drivers 22, and thus the movement of module 78, as denoted by block 84, and loop back to decision block 80. This provides a safeguard to prevent inadvertent unloading. Controller 46 can also optionally output a signal or message to the operator via device 58 or in another suitable manner, prompting or informing him or her to commence movement of the machine.

If movement of the machine is detected at block 80, or is commenced by the operator, e.g., responsive to the outputted message, after initiating or completely pausing of drivers 22, controller 46 will automatically continue or resume operation of drivers 22 for unloading the module 78, as denoted at block 86, in an automatic mode. In this mode, controller 46 will monitor the machine speed to determine if it is in a predetermined range, for example from just above zero to about 3.6 miles per hour, as denoted at decision block 88. If yes, controller 46 will controllably operate drivers 22 at a predetermined ratio to the speed of movement of the machine, as denoted at block 90, which controlled speed will preferably be marginally faster than the speed of the machine, or a ratio of about 1.1:1. That is, a speed about 10 percent faster. This ratio has been found to be advantageous as it is sufficient to prevent leaning, and tearing or fracturing of module 78 when partially on door assembly 14 and surface 64, and other possible damage.

If, at decision block 88 the speed of machine 10 is not within the range, controller 46 will determine if it is greater than a maximum value, which can be, but is not limited to, the upper limit of the range, e.g., 3.6 miles per hour, or another suitable value, as denoted at decision block 92. If yes, then a signal or information will be outputted to display device 58, as denoted at block 94, indicating this to the operator, who will hopefully decrease the machine speed using the propulsion control 52 to eliminate this message. Here though, controller 46 will preferably still automatically maintain the operation of drivers 22 at a speed sufficient to prevent damage to module 78 and/or module builder 12 and door assembly 14. When module 78 has been unloaded, the unloading routine can be automatically or manually ended, to stop operation of drivers 22, fold door assembly 14, and lower module builder 12.

While operating in the automatic mode, as denoted by decision block 96, and also earlier as denoted by block 82, and optionally at any other desired time during automatic operation, if a predetermined input command is received, e.g., momentary operation of input device 50, or a pattern of contacts, the system can be switched to a manual mode of operation, to allow manual of drivers 22, as denoted at block 98. Likewise, while in the manual mode, if a predetermined input command is received, e.g., another momentary operation of device 50, as denoted at decision block 100, operation can be switched to the automatic mode. In the manual mode, the operator can move machine 10 in any desired direction, using propulsion control 52, while using input device 50 to control operation of drivers 22.

Figure 5:
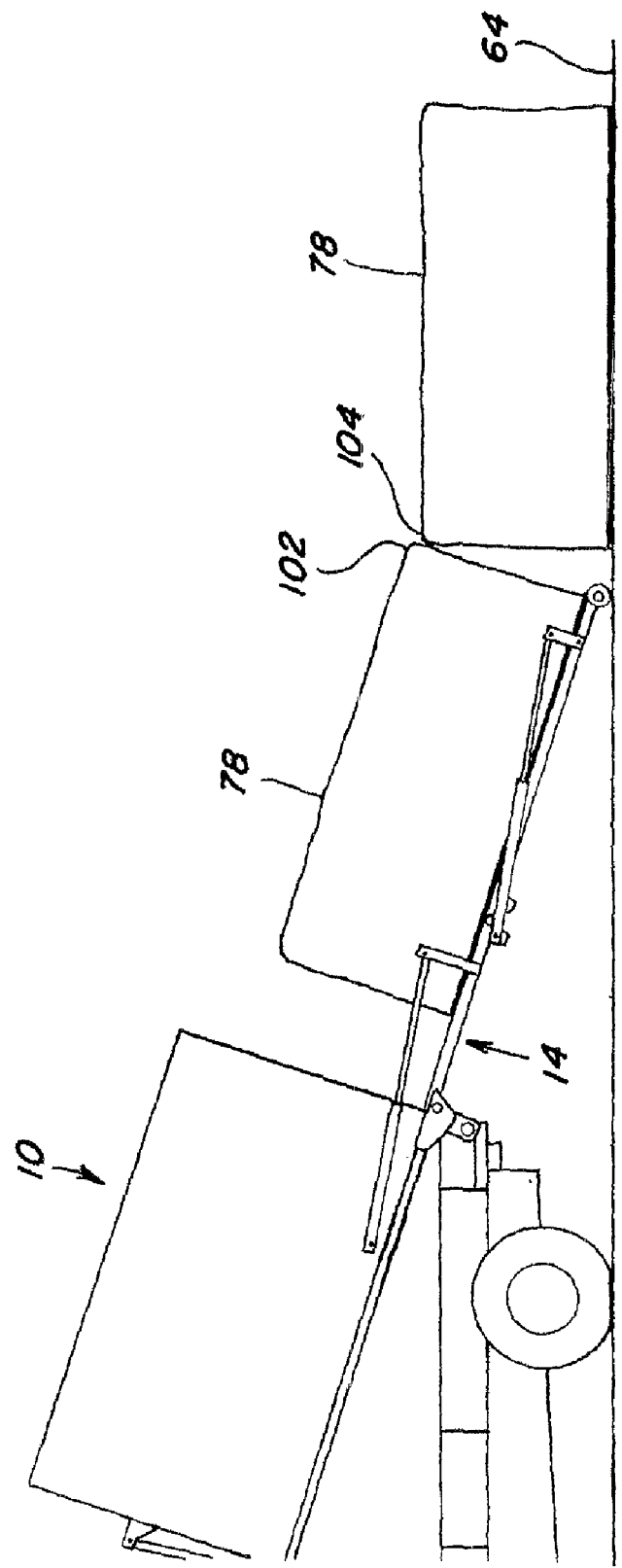
FIG. 5 is another partial side view of the harvester, illustrating an initial step of aligning a module to be unloaded with another module.

For example, referring more particularly to FIGS. 5, 6 and 7, machine 10 can be maneuvered to position door assembly 14 for locating an upper rear end 102 of a module 78 to be unloaded, in contact with or close to an upper front end 104 of an existing module 78 (FIG. 5). This can be done with module 78 to be unloaded still in the module builder, moving down door assembly 14, or already paused at the end of door assembly 14. The manual mode allows operation of drivers 22 with or without accompanying movement of machine 10. As an example, referring to FIG. 6, with module 78 to be unloaded on the end of door assembly 14 and in abutment with an existing module 78, the manual mode allows operation of drivers 22 (arrow A) to push module 22 to be unloaded against the stationary module 78, to achieve a desired closeness thereto. Then the propulsion control 52 can be operated as desired or required (typically slower than the speed of operation of drivers 22 at least initially) to move machine 10 in the unloading direction, as denoted by arrow B. Then, when the desired positioning has been achieved, manual operation can be continued, or automatic operation used, to synchronize unloader speed with machine speed, at the ratio set forth above, to complete the unloading operation as illustrated in FIG. 7.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for unloading a compacted mass of crop material down an inclined ramp of a self-propelled vehicle, comprising steps of:

providing at least one driver on the ramp operable for controllably moving the mass down the ramp and onto a surface therebelow;

providing a controller connected in operative control of the at least one driver;

providing information representative of a speed of movement of the vehicle over the surface to the controller;

providing an input device connected to the controller and operable by an operator for inputting commands to the controller;

providing a device connected to the controller for outputting information to a human operator;

providing a propulsion control operable by the operator for controlling the speed of movement of the vehicle over the surface; and responsive to initiation of an unloading routine:

automatically initiating operation of the at least one driver for moving the mass down the ramp while monitoring the speed of movement of the vehicle over the surface, and:

a. if the speed of movement of the vehicle is equal to or greater than a predetermined value, then automatically continuing the operation of the at least one driver to move the mass down the ramp and onto the surface; or b. if the speed of movement of the vehicle is less than the predetermined value and absent a command from the input device, then automatically pausing the operation of the at least one driver to stop the movement of the mass down the ramp before reaching the surface, and subsequently enabling continuing the operation of the at least one driver to move the mass down the ramp onto the surface only if a command from the input device is received, or the speed of movement of the vehicle reaches the predetermined value;

and upon the enabling of the continued operation of the at least one driver:

c. if the speed of movement of the vehicle is within a predetermined range, then automatically controlling the operation of the at least one driver for moving the mass down the ramp at a speed which is at a predetermined ratio to the speed of movement of the vehicle, or if a command from the input device is received by the controller, then to allow the operator to control the operation of the at least one driver; and d. if during the automatic control of the operation of the at least one driver the speed of movement of the vehicle is greater than the predetermined range, then automatically outputting information representative thereof to the operator.

2. The method of claim 1, wherein the predetermined value comprises a number greater than zero.

3. The method of claim 1, wherein the propulsion control is configured for manual operation by the operator and the input device is located on the propulsion control so as to be manually operable by a hand operating the propulsion control.

4. The method of claim 3, wherein the input device comprises a momentary contact switch, and the commands are inputted to the controller by momentary operation of the switch.

5. The method of claim 1, wherein the step of pausing the operation of the at least one driver is automatically executed gradually by the controller, and the controller will simultaneously output a signal or information to prompt the operator to commence movement of the vehicle.

6. The method of claim 1, wherein the at least one driver comprises a drag chain.

7. The method of claim 1, wherein the vehicle comprises a cotton harvester with an onboard cotton module builder, and the compacted mass of crop material comprises a cotton module.

8. The method of claim 1, wherein the ratio comprises a value of about 1.1:1.

9. The method of claim 1, wherein the device connected to the controller for outputting information comprises a display device.

10. A system for unloading a compacted mass of crop material down an inclined ramp of a self-propelled vehicle, comprising:

at least one driver on the ramp operable for controllably moving the mass down the ramp and onto a surface therebelow;

a controller connected in operative control of the at least one driver;

apparatus operable for outputting information representative of a speed of movement of the vehicle over the surface to the controller;

an input device connected to the controller and operable by an operator for inputting commands to the controller;

a device connected to the controller for outputting information to a human operator; and a propulsion control operable by the operator for controlling the speed of movement of the vehicle over the surface;

wherein the controller is configured responsive to initiation of an unloading routine, to:

automatically initiate operation of the at least one driver for moving the mass down the ramp while monitoring the speed of movement of the vehicle over the surface, and:

a. if the speed of movement of the vehicle is equal to or greater than a predetermined value, then to automatically continue the operation of the at least one driver to move the mass down the ramp and onto the surface; or b. if the speed of movement of the vehicle is less than the predetermined value and absent a command from the input device, then to automatically pause the operation of the at least one driver to stop the movement of the mass down the ramp before reaching the surface, and to subsequently enable continuing the operation of the at least one driver to move the mass down the ramp onto the surface only if a command from the input device is received or the speed of movement of the vehicle reaches the predetermined value;

and upon the enabling of the continued operation of the at least one driver:

c. if the speed of movement of the vehicle is within a predetermined range, then to automatically control the operation of the at least one driver for moving the mass down the ramp at a speed which is at a predetermined ratio to the speed of movement of the vehicle, or if a command from the input device is received by the controller, to allow operator control of the at least one driver; and d. if, during the automatic control of the operation of the at least one driver the speed of movement of the vehicle is greater than the predetermined range, to automatically output information representative thereof to the operator.

11. The system of claim 10, wherein the controller is configured to automatically pause the operation of the at least one driver gradually, and to automatically output a signal or message prompting the operator to commence movement of the vehicle.

12. The system of claim 10, wherein the propulsion control is configured for manual operation by the operator and the input device is located on the propulsion control so as to be manually operable by a hand operating the propulsion control.

13. The system of claim 12, wherein the input device comprises a momentary contact switch momentarily operable to input the commands to the controller, respectively.

14. The system of claim 10, wherein the at least one driver comprises a drag chain.

15. The system of claim 10, wherein the vehicle comprises a cotton harvester with an onboard cotton module builder, and the compacted mass of crop material comprises a cotton module.

16. The system of claim 10, wherein the ratio comprises a value of about 1.1:1.

17. The system of claim 10, wherein the device connected to the controller for outputting information comprises a display device.

18. A system for unloading a cotton module from an onboard module builder on a self-propelled cotton harvester, comprising:

an unloading ramp deployable so as to extend downwardly from the module builder to a surface therebelow, and at least one driver on the ramp operable for controllably moving the module downwardly therealong;

a controller connected in operative control of the at least one driver;

apparatus operable for determining information representative of a speed and direction of movement of the harvester over the surface and outputting a signal representative thereof to the controller;

a device connected to the controller for outputting information to a human operator;

a propulsion control configured to be operable by an operator for controlling the speed of movement of the harvester over the surface; and an input device connected with the controller and operable by momentary actuation by the operator for inputting commands to the controller;

wherein the controller is configured and operable to allow an operator to use the propulsion control to maneuver the harvester with the unloading ramp deployed into a desired position for unloading the module, prior to the module contacting the surface, and, responsive to a momentary actuation of the input device, to automatically operate in an unloading routine to control the at least one driver for moving the module down the ramp while monitoring the speed of movement of the harvester, and only allowing the module to be unloaded onto the surface if the harvester is moving or a command is inputted to the controller by a momentary actuation of the input device, and thereafter, to allow the operator to use the input device to select: an automatic operating mode wherein the controller will continue to monitor the speed of movement of the harvester and to automatically operate the at least one driver at a predetermined ratio to the speed of movement of the harvester, and to output information to the operator if the speed of movement of the harvester is greater than a predetermined value; or a manual mode to allow the operator to control the operation of the at least one driver.

19. The system of claim 18, wherein the controller is configured to automatically control the at least one driver to stop the movement of the module on the ramp gradually before reaching the surface, in absence of movement of the harvester or the command from the input device.

20. The system of claim 18, wherein the propulsion control is configured for manual operation by the operator and the input device is located on the propulsion control so as to be manually operable by a hand operating the propulsion control.

21. The system of claim 18, wherein the ratio comprises a value of about 1.1:1.

22. The system of claim 18, wherein the device connected to the controller for outputting information comprises a display device.

* * * * *